(12) United States Patent
Sola Gil

(10) Patent No.: US 11,628,630 B2
(45) Date of Patent: Apr. 18, 2023

(54) MACHINE FOR WELDING A PLASTIC SPOUT TO A PLASTIC PACKAGE

(71) Applicant: MESPACK, SL, Barcelona (ES)

(72) Inventor: Josep Sola Gil, Barcelona (ES)

( * ) Notice: Subject to any disclaimer, the term of this patent is extended or adjusted under 35 U.S.C. 154(b) by 34 days.

(21) Appl. No.: 17/383,579

(22) Filed: Jul. 23, 2021

(65) Prior Publication Data

US 2022/0024144 A1    Jan. 27, 2022

(30) Foreign Application Priority Data

Jul. 24, 2020 (ES) .............................. ES202031639

(51) Int. Cl.
   *B29C 65/10* (2006.01)
   *B29C 65/00* (2006.01)
   *B29C 65/78* (2006.01)

(52) U.S. Cl.
   CPC ........ *B29C 65/103* (2013.01); *B29C 65/7802* (2013.01); *B29C 66/5344* (2013.01); *B29C 66/8511* (2013.01); *B29C 66/91221* (2013.01)

(58) Field of Classification Search
   CPC .............. B29C 65/103; B29C 65/7802; B29C 66/5433; B29C 66/8511; B29C 66/91221; B29C 65/7876; B29C 66/53263; B29C 66/83221; B31B 70/844; B31B 70/005
   See application file for complete search history.

(56) References Cited

U.S. PATENT DOCUMENTS

| | | | | |
|---|---|---|---|---|
| 6,053,230 | A * | 4/2000 | Pelland | B29C 66/729 156/367 |
| 6,722,102 | B1 * | 4/2004 | Pape | B29C 66/8221 53/410 |
| 2002/0157348 | A1 * | 10/2002 | Hiramoto | B29C 66/83511 53/133.2 |
| 2008/0254962 | A1 * | 10/2008 | Mizuo | B29C 65/02 493/179 |
| 2014/0083061 | A1 * | 3/2014 | Ibaraki | B65B 3/02 53/558 |
| 2022/0152940 | A1 * | 5/2022 | Saez Lopez | B29C 66/81811 |

* cited by examiner

*Primary Examiner* — George R Koch
(74) *Attorney, Agent, or Firm* — Eugenio J. Torres-Oyola; Victor M. Rodriguez-Reyes; Rafael Rodriguez-Muriel

(57) ABSTRACT

The machine comprises a heating station (20) with hot air supply nozzles (22) facing one another and spaced apart; a unitary dispenser device (30) for dispensing plastic spouts into said heating station by a delivery element; a welding station (40); a gripping device (50) for gripping the plastic spout (5) at said heating station (20) and transferring it to the welding station (40) by turning said plastic spout (5) and placing a portion thereof, once heated, inside the open mouth (M) of a plastic package (2)); and a control unit (60) which manages in a coordinating manner the operation of the heating station (20), the dispenser device (30), the plastic spout delivery element, the gripping device (50) and the welding station (40).

6 Claims, 5 Drawing Sheets

MACHINE FOR WELDING A PLASTIC SPOUT TO A PLASTIC PACKAGE

FIELD OF THE INVENTION

The present patent relates to the field of flexible plastic packages for containing a product which flows or is capable of flowing, particularly those including two opposite panels made of a plastic film or sheet, selectively attached to one another, and incorporating a plastic spout or nozzle which is sealed between said opposite film panels.

The invention relates particularly to a machine for welding a plastic spout to a plastic package.

The invention also relates to the attachment of a plastic spout to a mouth section of a package by means of thermal and pressure welding, in which the melting temperatures of the materials of said plastic nozzle and of the plastic package are very close to one another or even the same, particularly for applying the invention to recyclable or degradable plastic packages, bags, or containers which have recently emerged in this field of technology.

STATE OF THE ART

In order to improve the nature of the attachment between the films of a package in an area of its mouth and the plastic spout, several approaches, including the inclusion of surface characteristics such as ribs or grooves in the plastic spout, specifically in a spot-welding interface portion, have been adopted in the state of the art.

Document EP1182144 B1 describes a method of securing a fitment to a package which includes providing a package wall material, engaging said fitment with a mandrel, inserting said fitment between the first and second edges of said package wall material, closing the outer sealing jaws onto the first and second edges of said material with the fitment engaged on the mandrel, and sealing said fitment to a portion of said first and second edges, wherein the mandrel is heated and therefore warms said fitment before the sealing step.

Document JP2005014467 A describes a pre-heating device for a plastic spout that will ultimately be welded to a plastic bag container. The pre-heating device is equipped with a heating conduit defining a conveyance pathway surrounding the sealing part S2 of a plastic spout which passes through said plastic spout conveyance pathway and receives a gust of hot air at a temperature of about 70 to 100 degrees centigrade in the heating conduit, and the plastic spout is then thermally welded to a plastic bag container.

Document DE102006030234 A1 describes a device for the production of plastic bags having one or more film dispensers (140) for provision of plastic films (120, 130) and film sterilizers (200) which sterilize the plastic films. A number of dispensers for plastic spouts 235 are provided. The plastic spouts 235 are transferred from a warehouse 230 to a spout sterilizing bath 240 which sterilizes the spouts 230. The plastic spouts 235 are then heated in a hot air oven 250 and irradiated with UV light before the plastic spouts 235 are inserted in a mouth of the plastic bag 110. Given that the plastic spouts 235 are sterilized before being inserted in the mouth of the already sterilized plastic bag 110, subsequent sterilization of the entire plastic bag 110 is not required.

Document WO2019219235 A1 (GEORG MENSHEN GMBH) relates to a method for welding in a removable connection, with its welding region having ribs between the flexible plastic films of a bag packaging, wherein the outer edges of the ribs of the welding region are heated to the welding temperature and in the molten state are put between the edge regions of the bag plastic films and the films are pressed onto the outer edges of the ribs, the outer edges of the ribs being deformed with a T-shaped cross-section when pressed in the molten state against the inner film wall, in order in this way to form an enlarged bearing surface on the inner film wall, and the one-, two- or multi-layer films of the bag packaging are made of the same plastic or the same type of plastic as that of the removal connection.

The present invention addresses the problem of effectively securing a plastic spout to a plastic package with a machine, in which the plastic spout and optionally the plastic package are pre-heated with one or more gusts of hot air that, however, works differently from what is described in JP2005014467 A, so that the operation can be carried out in a safer and more efficient manner.

BRIEF DESCRIPTION OF THE INVENTION

In order to solve the mentioned problem, this invention provides a machine for welding a plastic spout to a plastic package, wherein the plastic package comprises two film walls with an inner surface, an outer face, and a film welding interface in a mouth area of the package having a material with a known first melting temperature. Moreover, the plastic spout envisaged for being welded to an open mouth of the package comprises a neck portion with a pour channel having a longitudinal central axis L, and at least one welding interface portion made of a material with a known second melting temperature.

The machine of this invention is applied for connecting, by means of welding, i.e., through the provision of thermal energy and pressure, the welding interface of the plastic spout between said two film walls of the plastic package demarcating an open mouth thereof.

Said machine for welding plastic spouts to plastic packages comprises:

a heating station integrating two hot air supply nozzles directly facing one another and separated by a given distance, said hot air supply nozzles being connected to hot air supply conduits;

a unitary dispenser device for dispensing plastic spouts, configured for collecting a plastic spout from a storage unit and positioning it in said heating station by means of a delivery element, held at least at its welding interface portion, with its pour channel with a longitudinal central axis L in a vertical position and with the neck downwards, such that the welding interface portion of the plastic spout is located between said two hot air supply nozzles;

a welding station with two or more welding jaws arranged directly opposite and separated from one another, between which there is arranged a mouth section M of one plastic package of a plurality of plastic packages which are fed, in an aligned manner, by a conveyance line to said welding station, which provides pressure and a temperature close to said known first melting temperature to said mouth section M of the package;

a gripping device configured for temporarily holding the neck portion of the plastic spout in said heating station and rapidly transferring the plastic spout to the welding station, turning said plastic spout over and placing the welding interface portion of the plastic spout, once it has been heated to said temperature close to said known first melting temperature, inside the open mouth section M of one plastic package of said plurality of plastic packages; and at least one control unit managing, in a coordinated manner, the operation of said heating station, the dispenser device for dispensing plastic spouts, the delivery element for delivering the plastic spout, the gripping device, and the welding station, such that when the gripping device holds the neck portion of the plastic spout, this spout is immediately released from the hold of the delivery element.

According to an embodiment of this invention, the mentioned gripping device comprises two clamps assembled at the end of a motor-driven rotary shaft, such that a rotation of the shaft causes said quick transfer and turning over of the plastic spout, with the welding interface portion thereof going from said heating station to being located between the two film walls demarcating the open mouth section M of a plastic package in the welding station.

The two hot air supply nozzles of the heating station connected to the mentioned hot air fluid supply conduits, are configured for providing, under the control of said control unit, from a pressurized hot air source, gusts of pressurized hot air at a temperature close to said second melting temperature, to a welding interface portion of a plastic spout, located precisely between said hot air supply nozzles. The mentioned welding interface portion of the plastic spout therefore experiences a sudden increase in temperature as it receives one or more gusts of pressurized hot air.

The mentioned pressurized hot air supply nozzles directly facing one another are separated by a given distance and arranged on a horizontal plane.

In order to improve the conditions for welding the plastic spout, with its interface portion being pre-heated, to the packages, a pre-heating unit arranged at a point upstream of the welding station in the package conveyance line has further been envisaged, said pre-heating unit providing a pre-heating of at least the open mouth section M of the plastic package which must receive the mentioned preheated welding interface portion of the plastic spout.

Likewise, and according to one embodiment, said pre-heating of the open mouth section M of the package is performed based on the air coming from said hot air supply conduits.

For that purpose, the mentioned pressurized hot air supply conduits include gates that can be selectively opened, diverting a hot air stream to the pre-heating station of the conveyance line for conveying packages to the welding station.

The mentioned unitary dispenser device comprises two clamps configured for extracting a plastic spout from a storage unit or column of the dispenser device and moving it linearly to the outside where it is taken by a delivery element.

The mentioned delivery element in the proposed embodiment comprises a rod connected to an actuator configured for inserting said rod into the pour channel of the plastic spout in order to move the plastic spout vertically to the heating station, and more specifically to the area between the pressurized hot air supply nozzles.

Furthermore, in the proposed machine:
the rotary shaft incorporating the gripping device at one end is equipped, at the other distal end, with a connection to a rotation actuation device such as a servomotor or a geared motor, fixed to a mount of the machine;
the two clamps of the gripping device are arranged on a plane aligned with the axis of the rotary shaft; and
the axis of the rotary shaft and said plane are perpendicular to the conveyance line for conveying the packages to the welding station.

It will be understood that references to a geometric position such as, for example, parallel, perpendicular, tangent, etc., allow deviations of up to ±5° with respect to the theoretical position defined by said nomenclature.

It will also be understood that the provided end values of any range of given values may not be optimal and the invention may require being adapted to these applicable end values, with such adaptations being within reach of a skilled person.

Other features of the invention will become apparent in the following detailed description of an embodiment.

BRIEF DESCRIPTION OF THE FIGURES

The foregoing and other advantages and features will be more fully understood based on the following detailed description of an embodiment in reference to the attached figures that must be interpreted in an illustrative and non-limiting manner, in which.

DETAILED DESCRIPTION OF AN EMBODIMENT

Figure 1:
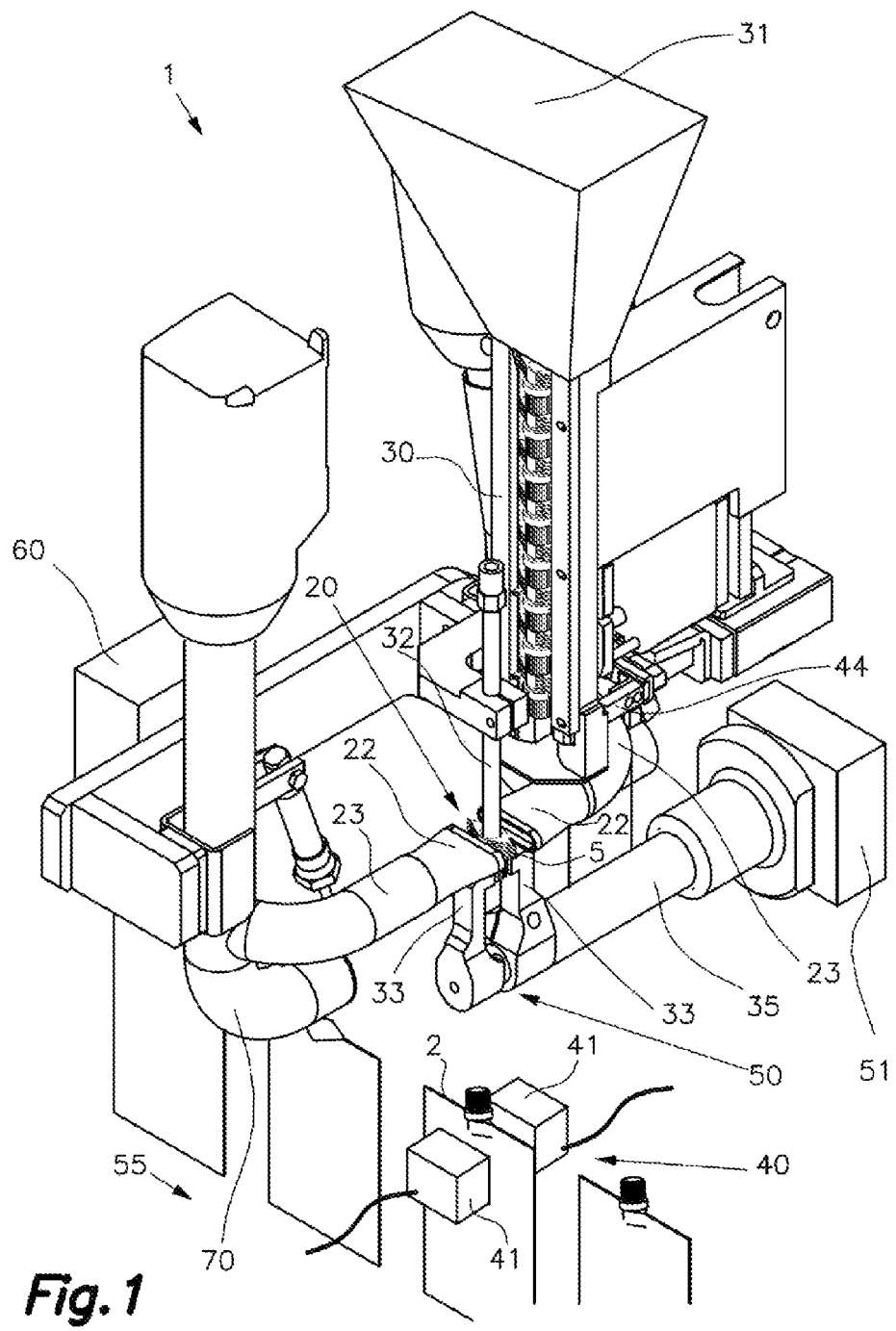
FIG. 1 shows a perspective view of a machine for welding a plastic spout to a package.

First, FIGS. 1, 2, 3, 4, and 5 show an embodiment of a machine 1 for welding a plastic spout 5 to a plastic package 2. The machine 1 comprises a heating station 20 integrating two hot air supply nozzles 22 which are coplanar, located directly facing one another, and also separated by a given distance, such that this distance provides a sufficient space for the placement of a plastic spout 5 with a welding interface portion 5b located very close to and facing said hot air supply nozzles 22.

Figure 4:
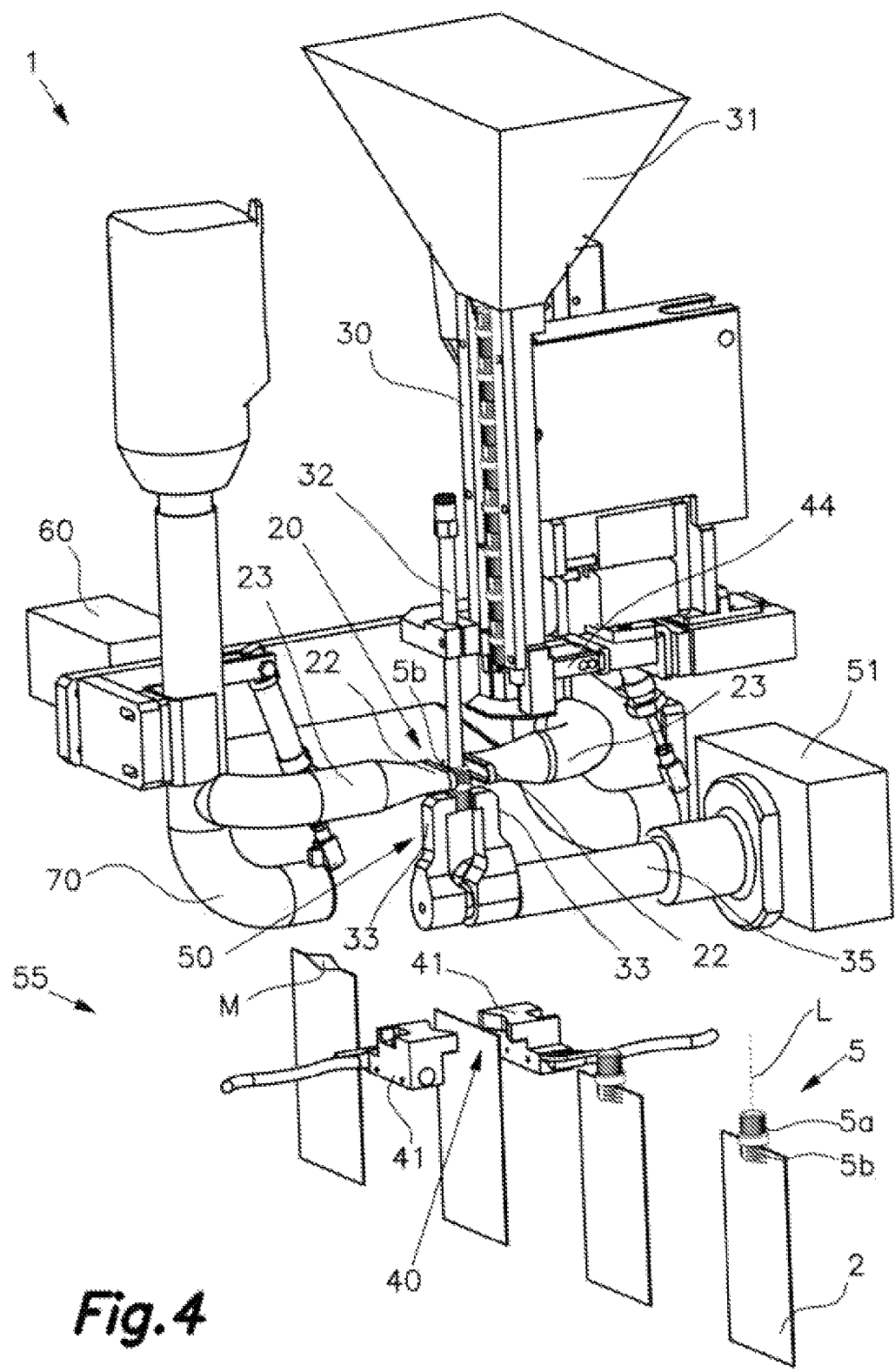
FIG. 4 is a perspective view of a machine for welding a plastic spout in a position of holding a plastic spout in a pre-heating area.
Figure 5:
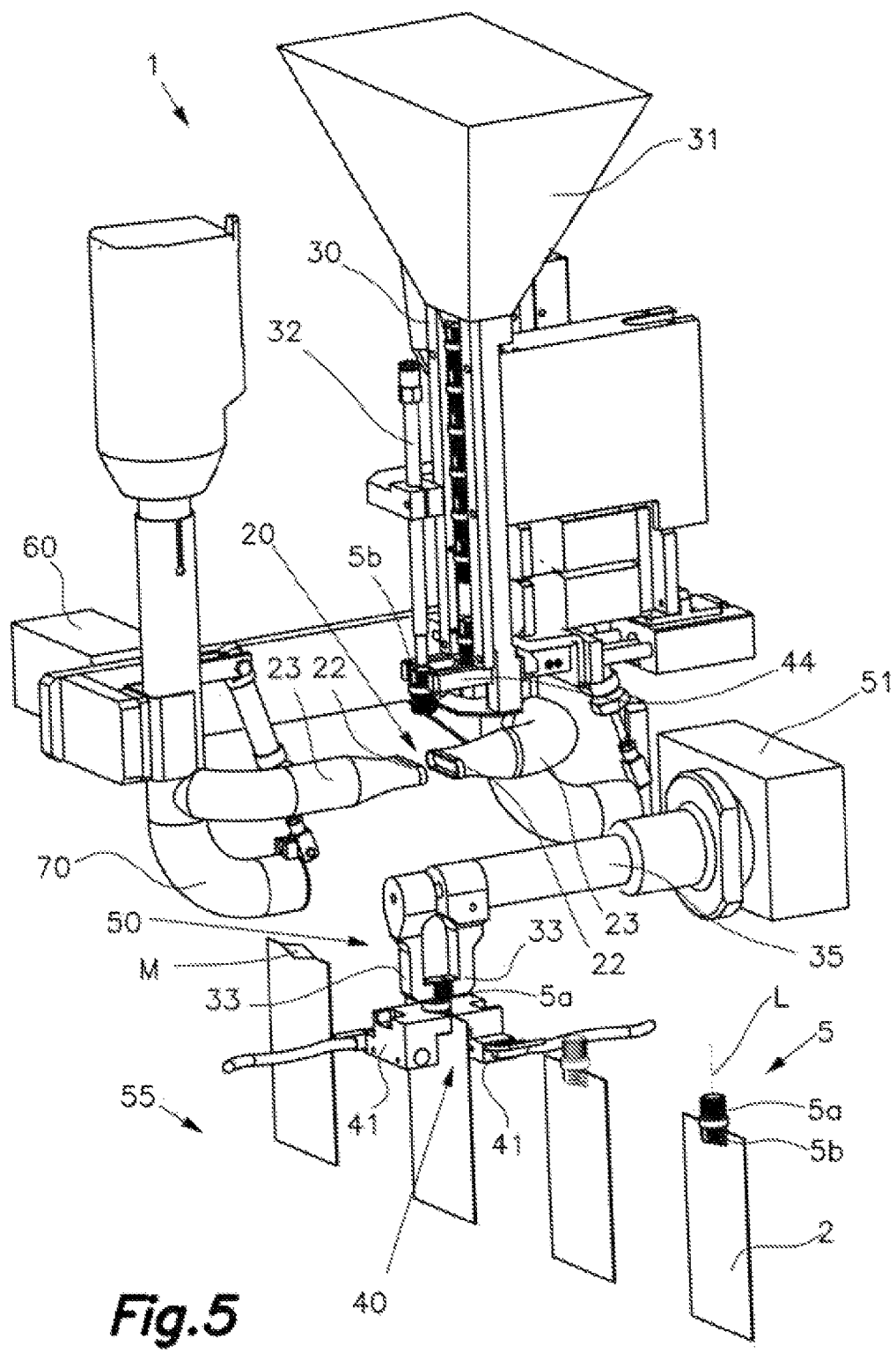
FIG. 5 shows a perspective view of a machine for welding a plastic spout in a position of welding the plastic spout which has been turned over from the pre-heating area and introduced in the open mouth of a plastic package.

FIGS. 1, 4, and 5 also show a plastic package 2 comprising two film walls made of at least one plastic sheet material having an inner surface and an outer face. The film walls also comprise, in one region, a film welding interface having a material with a known first melting temperature. The plastic spout 5 comprises a spout neck portion 5a having a pour channel with a longitudinal central axis L, and a welding interface portion 5b of the plastic spout 5 having a material with a known second melting temperature, wherein the welding interface 5b of the plastic spout 5 is connected between said two film walls of the plastic package 2 by means of welding.

In one embodiment, the two hot air supply nozzles 22 of the heating station 20 are connected to pressurized hot air supply conduits 23 and are configured for providing, under the control of a control unit 60, one or more gusts of hot air at a temperature close to said second melting temperature (being able to exceed said temperature), to said welding interface portion 5b of a plastic spout 5 located precisely between the two hot air supply nozzles 22.

In the embodiment shown in FIGS. 1 to 5, the two hot air supply nozzles 22, directly facing one another and separated by a given distance, are placed on a horizontal plane and connected to the respective hot air supply conduits 23 providing pressurized hot air from a pressurized hot air source, and the hot air supply conduits 23 include, in a segment before said conduits, gates that can be selectively opened and thereby allow part of the pressurized hot air flow to be diverted to a conduit 70 (see FIG. 1) to be supplied to a pre-heating unit for pre-heating the packages 2 in the conveyance line 55 thereof, preceding the welding station 40.

FIGS. 1 to 5 also show a unitary dispenser device 30 for dispensing plastic spouts 5, configured for collecting a plastic spout 5 from a storage unit 31 and positioning it in said heating station by means of a delivery element, held at least at the welding interface portion 5*b* of the plastic spout with a pour channel having a longitudinal central axis L of the plastic spout 5 in a vertical position and with the neck downwards, such that the welding interface portion 5*b* of the plastic spout is located between said two hot air supply nozzles 22. The unitary dispenser device 30 comprises two clamps 44 configured for extracting a plastic spout 5 from its storage unit 31 (in the form of a column) and moving it linearly forward and the delivery element comprises a rod 32 connected to an actuator configured for arranging the rod 32 such that it is inserted into the pour channel of the plastic spout to transfer said plastic spout 5 vertically to the heating station 20.

The machine 1 in FIGS. 1-5 shows a welding station 40 which comprises at least two welding jaws 41 arranged directly opposite and separated from one another, between which there is arranged an open mouth section M of one plastic package 2 of a plurality of plastic packages 2 which are fed, in an aligned manner, by a conveyance line 55 to this welding station 40. The welding station 40 provides pressure and a temperature close to the mentioned known first melting temperature of at least the mouth area of the package 2, in a welding region of the plastic package 2.

In FIGS. 1 to 5, the machine 1 has a gripping device 50 configured for temporarily or instantaneously gripping a neck portion 5*a* of the plastic spout 5 from the heating station 20 and quickly transferring the plastic spout 5 to the welding station 40, moving such that it rotates or turns the plastic spout 5 over and placing the welding interface portion 5*b* of the plastic spout, once it has been heated by the mentioned gust or gusts of hot air, into the open mouth section M of the plastic package 2. The gripping device 50 helps a plastic spout 5 to rotate about a motor-driven shaft 35 in a two-step rotational movement which describes one positioning rotation angle for each individual step from the original pre-heating position to the welding area and the return to the original position. FIG. 1 also shows a rotation actuation device 51 connected to the rotary shaft 35 of the gripping device 50.

The control unit 60 shown in FIGS. 1 to 5 manages the coordination of the operation of the heating station 20, the dispenser 30 for dispensing plastic spouts 5, the delivery element for delivering plastic spouts 5, the gripping device 50, and the welding station 40, such that when the gripping device 50 holds the neck portion 5*a* of the plastic spout 5, this spout is immediately released from the hold of the delivery element (rod 32) so that it can be rapidly transferred, after heating, by means of a positioning rotation which turns the spout over, to the area for welding with the package 2.

The proposed gripping device 50 comprises two clamps 33 assembled at the end of a motor-driven rotary shaft 35, and the two clamps 33 are arranged on a plane aligned with the axis of the rotary shaft 35, the axis of the rotary shaft 35 and the plane being perpendicular to the conveyance line 55 of the packages 2 which drives the packages 2 to the welding station 40. A rotation of the shaft 35 thereby determines the quick transfer by moving the welding interface portion 5*b* of the plastic spout 5 from the heating station 20, the spout being turned over and with an immediate positioning of said welding interface portion 5*b* between the two film walls demarcating the open mouth section M of a plastic package 2 in the welding station 40.

As illustrated in FIG. 1, the machine 1 also comprises a pre-heating unit arranged at a point upstream of the welding station 40 in the conveyance line 55 for conveying the package 2. This pre-heating unit provides a pre-heating of the part of the plastic package 2 such as, for example, the open mouth section M of the plastic package 2, and this pre-heating is performed by means of part of the hot fluid provided to the heating station by the hot air supply conduits 23 diverted to a supply conduit 70.

In one embodiment, the welding interface portion 5*b* of the plastic spout 5 is canoe-shaped, i.e., a typical configuration that is known per se, and includes several sealing ribs extending from the neck portion which, when arranged in the heating station 20, are closer to the blowing nozzle of the nozzles 22.

Figure 2:
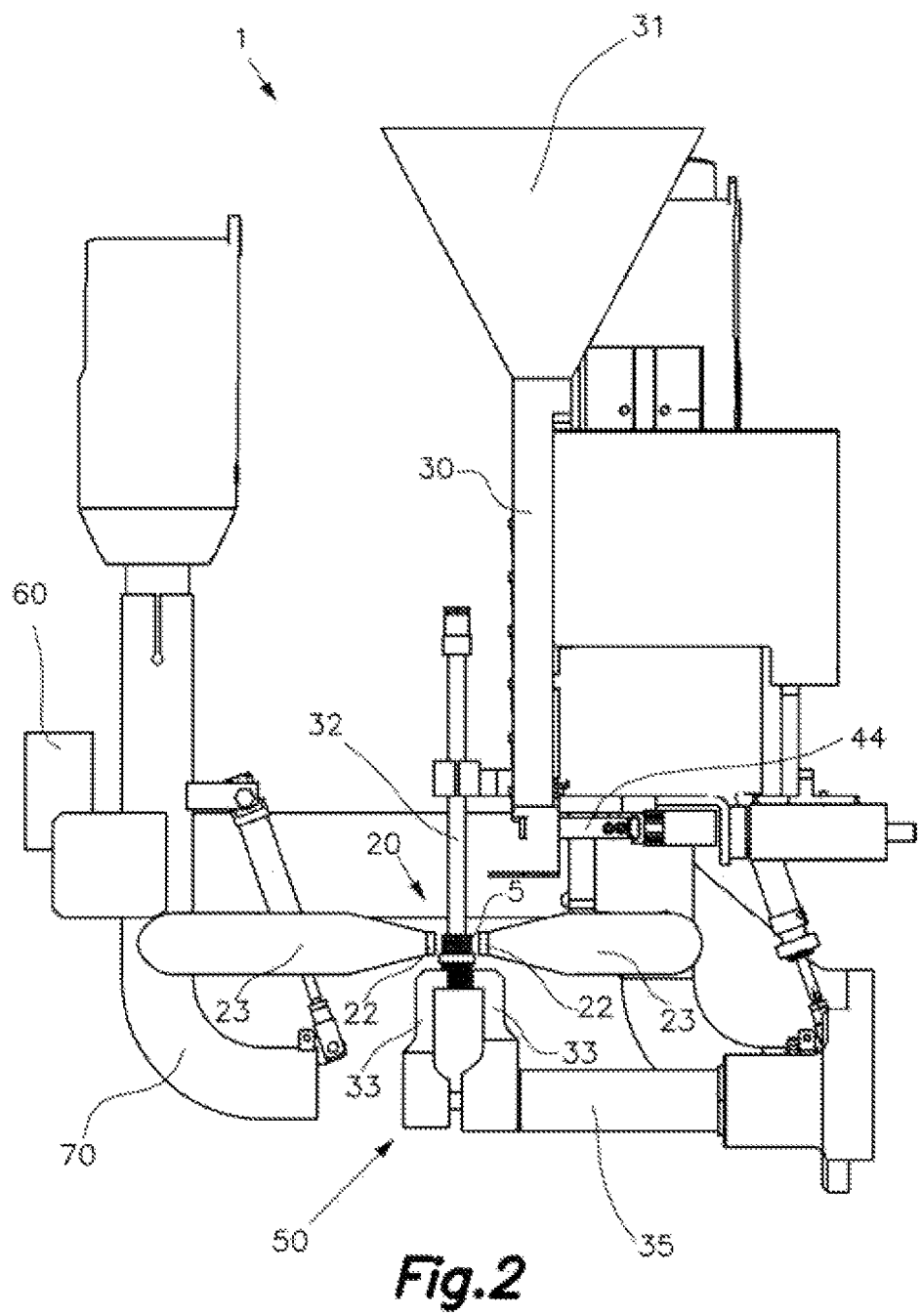
FIG. 2 shows a front elevational view of a machine for welding a plastic spout.
Figure 3:
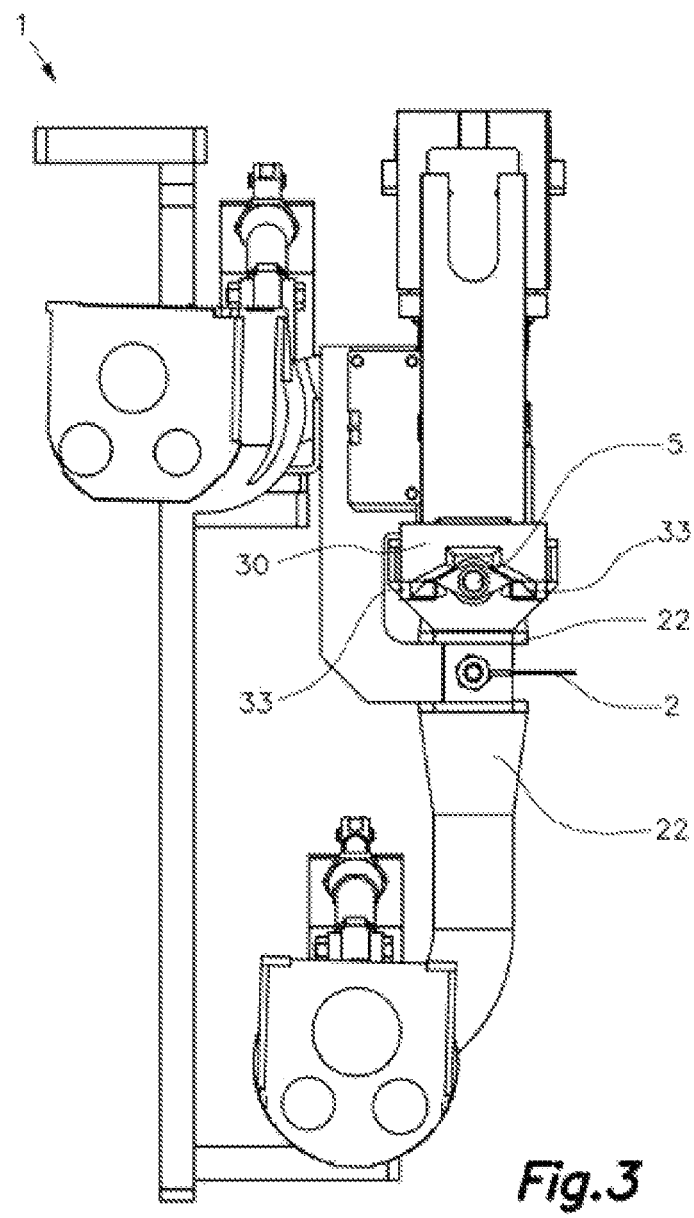
FIG. 3 is a view from the lower part of a machine for welding a plastic spout.

FIG. 4 illustrates the same machine 1 shown in FIGS. 1 to 3. In FIG. 4, the machine 1 is in a position or stage in which the pair of clamps 33 of the gripping device 50 are gripping the plastic spout 5 which is in the heating station 20 and are about to transfer the plastic spout 5 from the heating station 20 to the welding station 40. In the heating station 20, the welding interface portion 5*b* of the plastic spout 5 has been heated suddenly (which prevents damaging the material of said portion 5*b*) and once the portion 5*b* of the plastic spout 5 has reached a temperature close to the melting temperature, the two pairs of clamps 33 quickly carry it to the welding station 40.

FIG. 5 illustrates the same machine 1 shown in FIGS. 1-4 in a position or stage in which the pair of clamps 33 of the gripping device 50 have been moving in one step, describing a rotational movement about the rotary shaft 35 with the neck portion 5*a* of the plastic spout 5 gripped by the pair of clamps 33 and with the transfer of the portion 5*b* of the plastic spout 5 into the open mouth section M of the plastic package 2 by means of turning said spout over, such that the welding interface portion 5*b* of the plastic spout, which has been previously heated in the heating station 20, is located between two plastic films or film walls making up a plastic package 2 and establishes contact therewith. The plastic package 2 arrived from the conveyance line 55 with a plurality of plastic packages 2, one by one, and with the mouth section M of same also preheated.

FIG. 5 also depicts the transfer of the plastic spout 5 to the welding station 40 by means of the gripping device 50. As shown in this figure, the plastic spout 5 has been located between an open mouth section M housing the two plastic films forming a plastic package 2. In FIG. 5, the plastic spout 5 has been located in the plastic package 2 and will be welded and sealed to the plastic package 2 by means of the welding jaws 41 transmitting the temperature required for welding the plastic package 2 with the plastic spout 5, the welding interface portion 5*b* of which has been previously heated in the heating station 20 by the hot air ejected by the two supply nozzles 22 which are connected to two hot air supply conduits 23. The two welding jaws 41 also provide pressure, allowing the plastic spout 5 to be sealed inside the plastic package 2.

In a possible exemplary implementation, the described machine has been envisaged to comprise several parallel conveyance lines 55 for conveying the packages 2, each of which includes a corresponding welding station 40. In this case, the plastic spouts 5 would be transferred to said two or more welding stations 40 by sets of gripping devices 50, arranged in parallel and receiving the plastic spouts 5 from one or more dispenser devices 30.

In an alternative embodiment, the invention likewise contemplates a machine for welding plastic spouts 5 to packages 2, wherein the conveyance line 55 works by means of a simultaneous forward movement of two or more packages 2 to a number of welding stations 40 corresponding to the number of packages 2 of each forward movement. In this case, the machine comprises a set of gripping devices 50 arranged such that they are aligned above said welding stations 40 for transferring corresponding plastic spout from one or more dispenser devices 30 to such stations.

The machine for welding plastic spouts 5 to packages 2, in any of its possible described implementations, may further comprise a data acquisition system for acquiring data about the temperature of the pre-heating stations for pre-heating the plastic spouts 5 and the packages 2, and about the operating conditions of the welding station or stations 40, including at least pressure and temperature, assuring the quality of the welds welding the plastic stoppers 5 to the packages 2, and allowing the centralization of all the data in a control unit for consulting said data or transferring same to a local or remote control.

The features of this invention are defined by the following set of claims which complement this description.

The invention claimed is:

1. A machine for welding a plastic spout to a plastic package, the plastic package comprising two film walls with an inner surface, an outer face, and a film welding interface having a material with a known first melting temperature, and the plastic spout having a neck portion with a pour channel having a longitudinal central axis, and at least one welding interface portion made of a material with a known second melting temperature, the welding interface being connected by welding between said two film walls of the plastic package, characterized in that the machine comprises:
 a heating station integrating at least two hot air supply nozzles directly facing one another and separated by a given distance, said hot air supply nozzles being connected to hot air supply conduits;
 a unitary dispenser device for dispensing plastic spouts, configured for collecting a plastic spout from a storage unit and positioning it in said heating station by means of a delivery element, held at least at its welding interface portion, with its pour channel with a longitudinal central axis in a vertical position and with the neck downwards, the welding interface portion being located between said two hot air supply nozzles, said unitary dispenser device comprising two clamps configured for extracting the plastic spout from the storage unit of said dispenser device and moving it linearly, said delivery element comprising a rod connected to an actuator configured for inserting said rod into the pour channel of the plastic spout in order to move the plastic spout vertically to the heating station;
 a welding station comprising at least two welding jaws arranged directly opposite and separated from one another, between which there is arranged a mouth section of a plastic package of a plurality of plastic packages which are fed, in an aligned manner, by a conveyance line to said welding station, which provides pressure and a temperature close to said known first melting temperature to said mouth section;
 a gripping device configured for temporarily gripping the neck portion of the plastic spout in said heating station and rapidly transferring the plastic spout to the welding station, by means of a positioning rotation, turning said plastic spout over and placing the welding interface portion of the plastic spout, once it has been heated, inside the open mouth section of a plastic package of said plurality of plastic packages; and
 at least one control unit managing, in a coordinated manner, the operation of said heating station, the dispenser device for dispensing plastic spouts, the delivery element for delivering the plastic spout, the gripping device, and the welding station, such that when the gripping device grips the neck portion of the plastic spout, this spout is released from the hold of the delivery element,
 wherein said gripping device comprises two clamps assembled at the end of a motor-driven rotary shaft, such that a rotation of the shaft determines said quick transfer and turning over of the plastic spout, with the welding interface portion of the plastic spout going from said heating station to being located between the two film walls demarcating the open mouth section of a plastic package in the welding station.

2. The machine according to claim 1, wherein the two hot air supply nozzles of the heating station connected to said hot air fluid supply conduits are configured for providing, under the control of said control unit, a gust of hot air at a temperature close to said second melting temperature, to a welding interface portion of a plastic spout, located precisely between said hot air supply nozzles.

3. The machine according to claim 1, wherein it further comprises a pre-heating unit arranged at a point upstream of the welding station in the conveyance line for conveying the package, said pre-heating unit providing a pre-heating of at least the open mouth section of the plastic package based on the air coming from said hot air supply conduits that include gates that can be selectively opened.

4. The machine according to claim 3, wherein each of said two hot air supply nozzles, directly facing one another and separated by a given distance, are arranged on a horizontal plane and connected to the respective hot air supply conduits providing hot air from a pressurized hot air source, and wherein said hot air supply conduits or an access segment thereof include gates that can be selectively opened, diverting a hot air stream to a conduit supplying hot air to said pre-heating unit.

5. The machine according to of claim 3, further comprising a data acquisition system for acquiring data about the temperature of the pre-heating unit for pre-heating the plastic spouts and the packages and about the operating conditions of the welding station, including at least pressure and temperature, assuring the quality of the welds of the plastic stoppers to the packages.

6. The machine according to claim 1, wherein:
 the rotary shaft incorporating the gripping device at one end is equipped with a connection to a geared motor at the other end;
 the two clamps of the gripping device are arranged on a plane aligned with the axis of the rotary shaft; and
 the axis of the rotary shaft and said plane are perpendicular to the conveyance line for conveying the package to the welding station-.

* * * * *